United States Patent

[11] 3,579,135

[72] Inventor Robert K. Anderson
Minneapolis, Minn.
[21] Appl. No. 788,238
[22] Filed Dec. 31, 1968
[45] Patented May 18, 1971
[73] Assignee Medtronic, Inc.
Minneapolis, Minn.

[54] FILTER NETWORK AND METHOD
1 Claim, 6 Drawing Figs.

[52] U.S. Cl. .......... 330/30, 330/31, 333/75
[51] Int. Cl. .......... H03f 3/68, H03h 7/10
[50] Field of Search .......... 330/30, 30 (D), 69, 126, 21, 31; 333/75; 329/140

[56] References Cited
UNITED STATES PATENTS

| | | | |
|---|---|---|---|
| 2,589,133 | 3/1952 | Purington .......... | 330/126 |
| 3,411,098 | 11/1968 | Perra .......... | 333/75X |
| 2,858,422 | 10/1958 | Reyburn et al. .......... | 329/140X |

*Primary Examiner*—John Kominski
*Assistant Examiner*—Lawrence J. Dahl
*Attorneys*—Lew Schwartz and Donald R. Stone

ABSTRACT: A filter network and method for the rejection of all but a selected band of frequency, the apparatus and method utilizing a pair of notch-type filters such as twin-T filters, with a common input connection and separate outputs connected to different inputs on a differential amplifier.

Patented May 18, 1971 3,579,135

INVENTOR.

ROBERT K. ANDERSON

BY

Lew Schwartz

ATTORNEY

FILTER NETWORK AND METHOD

BACKGROUND OF THE INVENTION

The apparatus and method of this invention relate generally to filter networks, and more specifically to a filter network for accurately rejecting all but a selected band of frequencies. Filter networks are well known in the art, and have many and varied uses. One problem that has arisen in various electrical circuits is the need for a network that will pass signals of a preselected frequency band, while rejecting comparatively large inputs of adjacent frequencies. Prior art attempts to achieve the desired network response by using a tuned passive network or a tuned active amplifier, that is, an amplifier with a feedback loop including a notch filter network, have met with problems of inadequate frequency discrimination or instability (e.g., ringing) with large magnitude inputs. It is believed that the problems of proper damping are too acute for any prior known solution, as either over or under damping results in undesirable situations.

SUMMARY OF THE INVENTION

Briefly described, the apparatus and method of this invention provide a solution to the above-mentioned problems by using a pair of passive notch filters, such as twin-T filters, which have their inputs connected to a common point adapted to receive a common input signal. Each output of the two filters is connected to a different input on a differential amplifier. The filters are tuned to different frequencies, one near the upper and one near the lower frequency of the band it is desired to pass, as will be more fully described below.

The filters have complex impedances which vary as a function of frequency of the applied input signal and which are substantially identical over the entire frequency spectrum except for a narrow frequency range from slightly below the lower resonant frequency to slightly above the upper resonant frequency. Throughout that frequency range, the complex impedances of the two filters are different thereby producing different complex output voltages for a common input signal which results in an output signal from the differential amplifier. To achieve a relatively large output signal from the network throughout the entire frequency range between the two resonant frequencies and still have relatively sharp cutoffs to the passband when bootstrapped twin-T filters are used, the upper resonant frequency must be not more than approximately twice the lower resonant frequency. When less sharp cutoffs to the passband can be tolerated, a relatively large output can be obtained throughout a band in which one resonant frequency is more than twice the other by properly skewing one or both of the filter response curves.

DESCRIPTION OF THE PREFERRED EMBODIMENT

Figure 1:
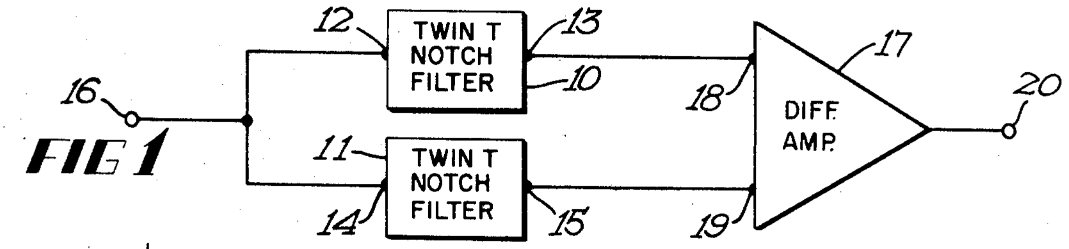
FIG. 1 discloses a block diagram of the apparatus of this invention.

Referring first to FIG. 1 there is shown, in block diagram form, a pair of notch filters 10 and 11, indicated as being twin-T filters. Filter 10 has an input terminal 12 and an output terminal 13. Filter 11 has an input terminal 14 and an output terminal 15. Input terminals 12 and 14 are connected to a signal input terminal 16, adapted to receive an electrical signal. Filters 10 and 11 are tuned to different resonant frequencies.

Also shown in FIG. 1 is a differential amplifier 17, having a pair of input terminals 18 and 19 and an output terminal 20. Output terminal 13 of filter 10 is connected to input terminal 18 of amplifier 17. Output terminal 15 of filter 11 is connected to input terminal 19 of amplifier 17. Therefore, in operation, an electrical signal appearing at signal input terminal 16 will be felt at input terminals 12 and 14 to be acted on by filters 10 and 11. The resulting output of filters 10 and 11 will be felt across input terminals 18 and 19 of amplifier 17, and where the two outputs vary sufficiently to be detected by differential amplifier 17, the final resulting output will appear at terminal 20. This operation will be more fully described below.

Figure 2:
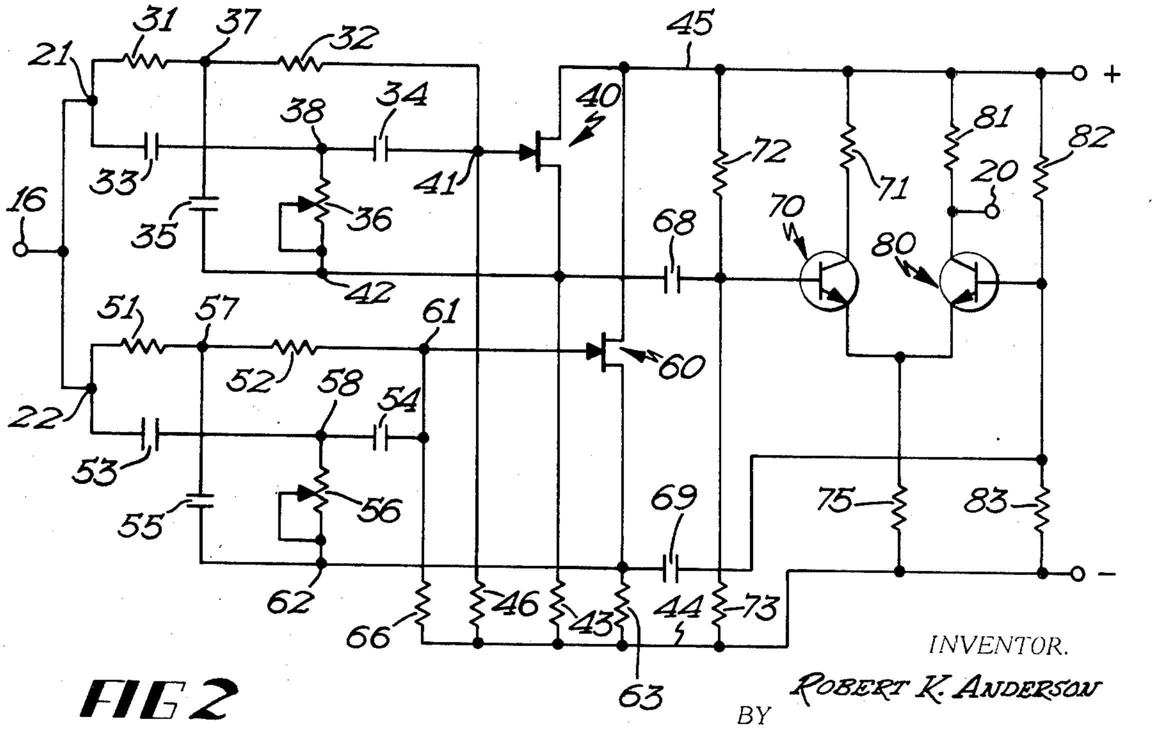
FIG. 2 is a schematic drawing of the apparatus shown in the block diagram of FIG. 1, comprising a preferred embodiment of the apparatus of this invention.

Referring now to FIG. 2, there is shown a schematic diagram of a preferred embodiment of the apparatus of this invention. A first twin-T filter, comparable to filter 10 of FIG. 1, is shown comprising a serially connected pair of resistors 31 and 32 connected in parallel with a serially connected pair of capacitors 33 and 34. A capacitor 35 and a variable resistor 36 are shown serially connected between a junction 37 and a junction 38. Junction 37 is a point between resistors 31 and 32, while junction 38 is a point between capacitors 33 and 34. A junction 41 between resistor 32 and capacitor 34 is connected through a resistor 46 to a ground bus 44. There is also shown a field effect transistor 40 having its gate electrode connected to junction 41, its source electrode connected through a resistor 43 to bus 44, and to a junction 42 between capacitor 35 and variable resistor 36, and its drain electrode connected to a positive bus 45.

In FIG. 2 there is also shown a second twin-T filter comparable to block 11 of FIG. 1 and comprising a pair of serially connected resistors 51 and 52 which are connected in parallel across a pair of serially connected capacitors 53 and 54. A capacitor 55 and a variable resistor 56 are connected between a junction 57 and a junction 58. Junction 57 is between resistors 51 and 52, while junction 58 is between capacitors 53 and 54. A junction 61 between resistor 52 and capacitor 54 is connected through a resistor 66 to negative bus 44. There is also shown a field effect transistor 60 having its gate electrode connected to junction 61, its source electrode connected through a resistor 63 to bus 44 and to a junction 62 between capacitor 55 and variable resistor 57, and its drain electrode connected to positive bus 45.

A junction 21 between resistor 31 and capacitor 33, and a junction 22 between resistor 51 and capacitor 53, are connected to signal input terminal 16.

There is also shown a differential amplifier comparable to amplifier 17 of FIG. 1, and comprising a pair of transistors 70 and 80, here shown as NPN transistors. The emitter electrodes of both transistors 70 and 80 are connected through a resistor 75 to negative bus 44. The collector electrode of transistor 70 is connected through a resistor 71 to positive bus 45, and the collector electrode of transistor 80 is connected through a resistor 81 to positive bus 45. The base electrode of transistor 70 is connected through a resistor 72 to bus 45, and through a resistor 73 to negative bus 44. The base electrode of transistor 80 is connected through a resistor 82 to bus 45, and through a resistor 83 to negative bus 44. The collector electrode of transistor 80 is shown connected to output terminal 20 of the differential amplifier such as 17 in FIG. 1. The source electrode of field effect transistor 40 is connected through a capacitor 68 to the base electrode of transistor 70. The source electrode of field effect transistor 60 is connected through a capacitor 69 to the base electrode of transistor 80.

Figure 3:
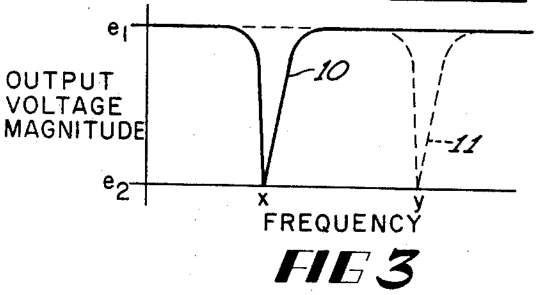
FIG. 3 is a graph denoting the output voltage magnitude, as a function of frequency, of each of the filters shown in FIGS. 1 and 2 for a constant voltage input.
Figure 5:
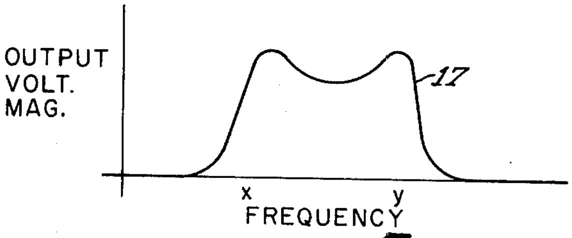
FIG. 5 is a graph denoting a general output voltage magnitude curve from the differential amplifier of FIG. 1 for a constant magnitude input signal to the notch filters as a function of frequency.
Figures 4, 6:
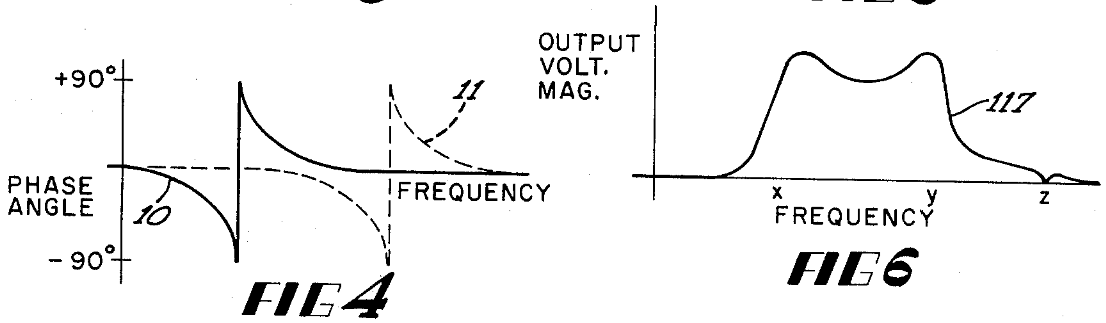
FIG. 4 is a graph denoting the output voltage phase angle, as a function of frequency, of each of the filters of FIGS. 1 and 2 for a constant voltage input.
FIG. 6 is a graph of a specific output voltage magnitude curve from the differential amplifier of FIG. 2, with properly chosen components, for a constant magnitude input signal to the notch filters as a function of frequency.

To best understand the operation of the apparatus of FIGS. 1 and 2, the graphs of FIGS. 3, 4 and 5 should first be explained. In FIG. 3, there is shown in solid lines a graph of the output voltage magnitude response to constant magnitude input signals of filter 10 of FIG. 1, while the response of filter 11 is shown in dotted lines. The graph is shown on an abscissa representing increasing frequency, and an ordinate representing increasing voltage. From the graph of FIG. 3 it will be apparent that for frequencies below that denoted X on the graph, the complex impedance of filter 10 is nearly constant and its output voltage will remain $e_1$, until the frequency approaches the resonant frequency X at which time the complex impedance of filter 10 begins changing and a sharp peak or notch output will lower the tuned filter 10 output to voltage $e_2$. However, as the frequency increases beyond the resonant frequency X of filter 10, the complex impedance returns to its original constant value and the output will again return to voltage level $e_1$. The same is true for filter 11, except that it is tuned to a resonant frequency Y, here shown as being a greater frequency than frequency X. Therefore, when filter 10 has responded to resonant frequency X the complex impedance of filter 11 has not yet begun to change substantially and its output voltage magnitude will remain at approximately the $e_1$ level, and conversely when filter 11 has responded to resonant frequency Y, the complex impedance of filter 10 will have returned to approximately its stable value and the output voltage magnitude will be at the $e_1$ voltage level.

Referring now to FIG. 4, there is shown a graph of the phase angle of the output voltage of filter 10 in solid lines, and filter 11 in dotted lines. The graph has an abscissa representing increasing frequency, and an ordinate representing phase angle. From the graph it is apparent that as the resonant frequency X of filter 10 is approached, its complex impedance changes thereby changing the output voltage phase angle and causing a 180° discontinuous phase change at the resonant frequency. Also, filter 11 reacts in a like manner near resonant frequency Y.

If resonant frequencies X and Y are properly chosen, a passband from slightly below X to slightly above Y is obtained in the network as is illustrated in FIG. 5. FIG. 5 depicts the output voltage magnitude from differential amplifier 17 as a function of frequency for a constant amplitude input signal at terminal 16. The complex output voltage of notch filter 10 for a constant magnitude input signal can be represented by a phasor whose magnitude, at any particular frequency, is a point of the solid curve in FIG. 3 and whose phase angle, at that frequency, is a point on the solid curve in FIG. 4. The complex output voltage of notch filter 11 can be represented by a similar phasor. Differential amplifier 17 produces a network output voltage which is the difference of those complex voltages. The magnitude of that network output voltage is shown in FIG. 5 and can be considered the response curve for the total filter network.

Referring now to FIG. 1, it can be seen that the outputs of filters 10 and 11 are connected to separate inputs to differential amplifier 17. It is well known in the art that in differential amplifiers such as 17 a difference in voltage must appear between input terminals 18 and 19 for an output to appear at terminal 20. Referring to FIGS. 3 and 4, it will be apparent that at frequencies well below X and well above Y, the complex impedances of filters 10 and 11 are equal so their output voltage magnitudes and phase angles are also equal, and thus there is no difference voltage between input terminals 18 and 19 of amplifier 17. However, between a frequency slightly below resonant frequency X of filter 10, and a frequency slightly above resonant frequency Y of filter 11, there is a band in which the magnitudes and the phase angles of the outputs of filters 10 and 11 differ because their complex impedances differ. During this time there will be a distinct difference in complex voltages between input terminals 18 and 19 of amplifier 17 which results in an output at terminal 20. From FIG. 5, it can be seen that the network output has maxima at frequencies X and Y because differential amplifier 17 receives a signal from only one filter. An attenuation of the network output signal occurs midway between frequencies X and Y and is increased as X and Y move farther apart. The curve shown in FIG. 5 results when Y=2X.

Referring now to the operation of FIG. 2, those skilled in the art will recognize the previously described components which make up the pair of twin-T filters comparable to filters 10 and 11 of FIG. 1. Field effect transistors 40 and 60, along with resistors 43 and 63, respectively, have been added to the respective twin-T filter to perform a bootstrapping operating on the outputs of the respective filter, in a manner known in the prior art. This bootstrapping is performed to sharpen up the amplitude and phase angle response curves of the twin-T filters. In response to an electrical signal at input terminal 16 of FIG. 2, the output of the upper twin-T filter will be felt through capacitor 68 to appear on the base electrode of transistor 70, while the output of the lower twin-T filter will be felt through capacitor 69 to appear on the base electrode of transistor 80. When the signals on the base electrodes of transistors 70 and 80 are of equal magnitude and phase angle, there will be no difference voltage, and no output at terminal 20. However, when the electrical signal input at terminal 16 has a frequency within the band where the notch filters have different complex impedances the complex voltages applied to the base electrodes of transistors 70 and 80 are not identical, so the resulting differential voltage produces an output signal at terminal 20.

An additional refinement is provided in each notch filter in FIG. 2 by the addition of properly chosen resistors 46 and 66. Resistor 46 loads one of the filters and resistor 66 loads the other to adjust their complex impedances as a function of frequency and to obtain controlled skewing in the output voltage and phase angle curves. By proper skewing, attenuation of signals between frequencies X and Y can be reduced with some loss of sharpness in signal attenuation at the edges of the passband. Without such skewing, frequencies near the center of the passband may be attenuated by a factor of 10 or more if Y is greater than 2X. Also, it is sometimes desireable to improve rejection of the network at one frequency, or in a narrow band (e.g., 50—60 Hz.) which lies outside the primary passband. Proper loading of the filters by adjustment of the size of resistors 43 and 66 can provide such a supplementary rejection band by skewing the response curves of the filters to provide a point at which the complex impedances of the two filters cross over in value before either has become independent of frequency.

FIG. 6 illustrates an output voltage response curve 117, as a function of frequency, which can be obtained from the circuit shown in FIG. 2. It can be seen that skewing has reduced attenuation near the center of the passband and has produced a notch in the curve centered at frequency Z. Choice of loading values can position such a notch at either a higher or lower frequency than those within the primary passband.

It is apparent from the above discussion that the apparatus and method of this invention can provide a desired output signal which will be present only during a selected frequency band, and be absent during frequencies above and below the band, the system or network being an improvement on susceptibility to unreliability or oscillation, and providing a maximized differential voltage with a minimal insertion loss in the selected frequency band.

I claim:

1. A filter network comprising: a first electrical filter having a resonant frequency and having an input connection and an output connection; a second electrical filter, connected in parallel with the first electrical filter, having a resonant frequency approximately double that of the first electrical filter and having an input connection and an output connection; single input means connected to the input connection of the first electrical filter and to the input connection of the second electrical filter for receiving an electrical signal; first high impedance means having an input connected to the output of the first electrical filter and having an output terminal, the first high impedance means for preserving the integrity of the input electrical signal that passes through the first electrical filter; a second high impedance means having an input connected to the output of the second electrical filter and having an output terminal, the second high impedance means for preserving the integrity of the input electrical signal that passes through the second electrical filter; and a differential amplifier having a first input connected to the output of the first high impedance means, a second input connected to the output of the second high impedance means, and having an output terminal, the differential amplifier subtracting the electrical signal from the first high impedance means from the electrical signal from the second high impedance means permitting, on the output terminal, the frequency range desired to pass.